United States Patent [19]
Graf et al.

[11] Patent Number: 5,749,060
[45] Date of Patent: May 5, 1998

[54] AUTOMATIC TRANSMISSION CONTROL FOR A MOTOR VEHICLE

[75] Inventors: Friedrich Graf, Regensburg; Kai Storjohann, Regensburg Grass; Michael Ulm, Alteglofsheim; Ralf-Johannes Lenninger, Regensburg; August Kammerl, Brunn, all of Germany

[73] Assignee: Siemens Aktiengesellschaft, Munich, Germany

[21] Appl. No.: 631,805

[22] Filed: Apr. 11, 1996

Related U.S. Application Data

[63] Continuation of PCT/DE94/01188, Oct. 10, 1994.

[30] Foreign Application Priority Data

Oct. 11, 1993 [DE] Germany .................. 43 34 595.6

[51] Int. Cl.$^6$ ....................................... G06G 7/10
[52] U.S. Cl. .................. 701/51; 701/53; 701/54; 477/72; 477/15; 477/109
[58] Field of Search ............ 364/424.1, 424.01, 364/424.03, 424.04, 550, 551.01, 431.04, 424.05, 431.03, 431.01, 132, 431.11, 431.12; 395/900, 905, 182.05, 183.01; 477/125, 143, 906, 155, 110, 111, 68, 72–80; 340/825.05, 825.5, 825.01, 825.65, 825.06, 436–438, 459; 73/117.3

[56] References Cited

U.S. PATENT DOCUMENTS

| | | | |
|---|---|---|---|
| 3,890,360 | 6/1975 | Pruvot et al. | 60/431 |
| 4,760,275 | 7/1988 | Sato et al. | 307/10.1 |
| 4,855,913 | 8/1989 | Brekkestran et al. | 364/424.095 |
| 4,864,568 | 9/1989 | Sato et al. | 364/424.01 |
| 4,894,781 | 1/1990 | Sato et al. | 364/431.04 |
| 4,945,481 | 7/1990 | Iwatsuki et al. | 364/424.1 |
| 4,967,385 | 10/1990 | Brekkestran et al. | 364/424.094 |
| 5,043,892 | 8/1991 | Brekkestran et al. | 364/424.08 |
| 5,052,246 | 10/1991 | Yamaguchi | 364/424.1 |
| 5,053,960 | 10/1991 | Brekkestran et al. | 364/424.08 |
| 5,113,343 | 5/1992 | Hunter et al. | 364/424.08 |
| 5,132,905 | 7/1992 | Takai et al. | 364/424.03 |
| 5,200,745 | 4/1993 | Takai et al. | 340/825.65 |
| 5,390,117 | 2/1995 | Graf et al. | 364/424.1 |
| 5,547,434 | 8/1996 | Graf et al. | 477/103 |

FOREIGN PATENT DOCUMENTS

| | | |
|---|---|---|
| 0284215 | 9/1988 | European Pat. Off. . |
| 0354544 | 2/1990 | European Pat. Off. . |
| 9112428 | 8/1991 | WIPO . |

OTHER PUBLICATIONS

Patent Abstracts of Japan, vol. 16, No. 124 (E–1193) Mar. 30, 1992 & JP-A-3289833 (HITACHI) Dec. 19, 1991.
Database WPI, Derwent 92-358204, Week 9244 & German document DE 41 12 738 (B.M.W.) Oct. 22, 1992.

*Primary Examiner*—Jacques Louis Jacques
*Attorney, Agent, or Firm*—Herbert L. Lerner; Laurence A. Greenberg

[57] ABSTRACT

A control configuration for a motor vehicle includes an engine control and a transmission control which are connected to one another through a communication channel. A transmission is shifted by using electrohydraulic pressure control valves for actuating friction elements in the transmission. The transmission control is mounted at a transmission housing. Solenoids of the electrohydraulic pressure control valves are integrated into the transmission control. Sensor signals which are to be evaluated by the transmission control are transmitted by sensors to the transmission control wirelessly.

5 Claims, 7 Drawing Sheets

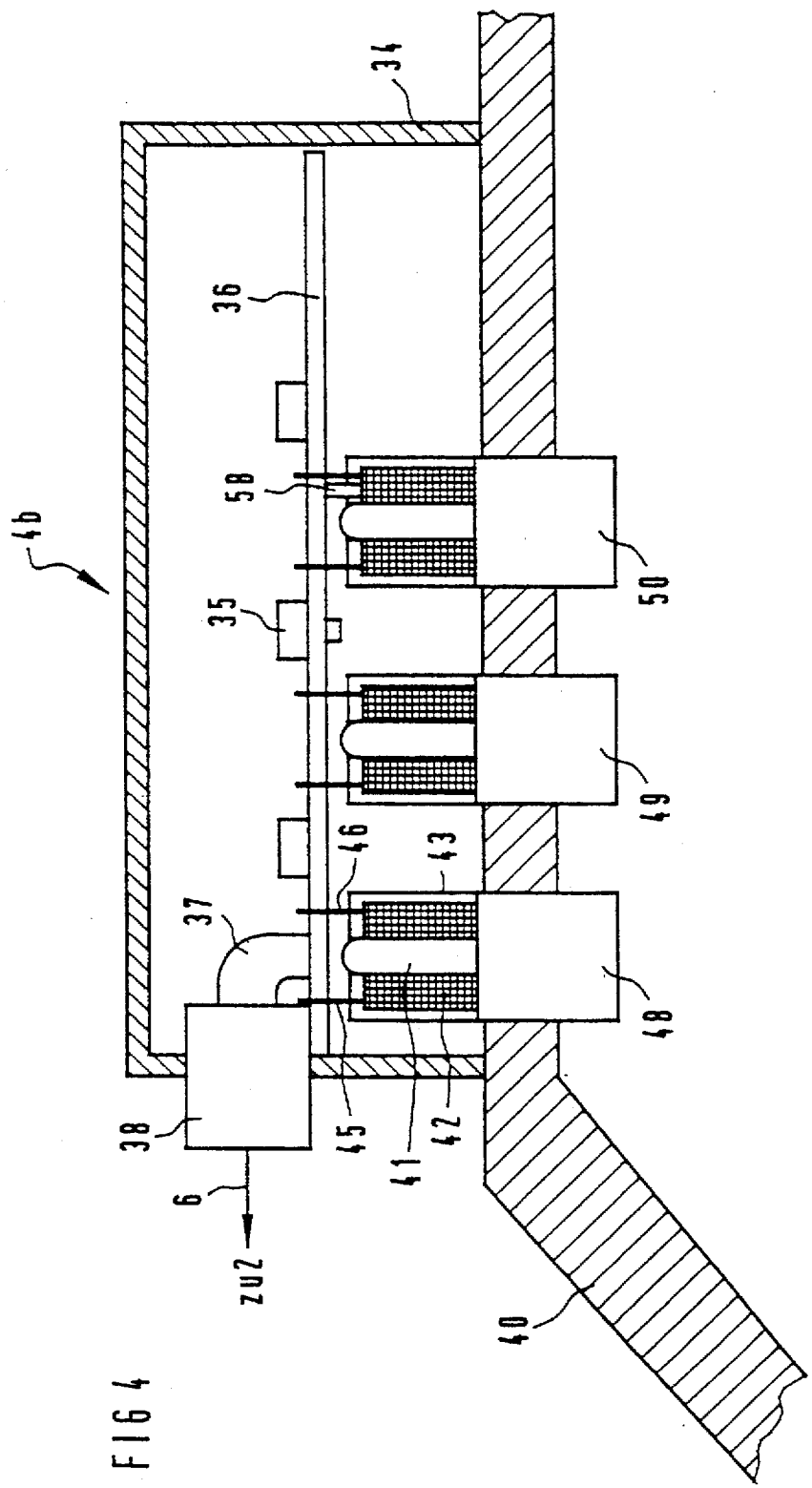

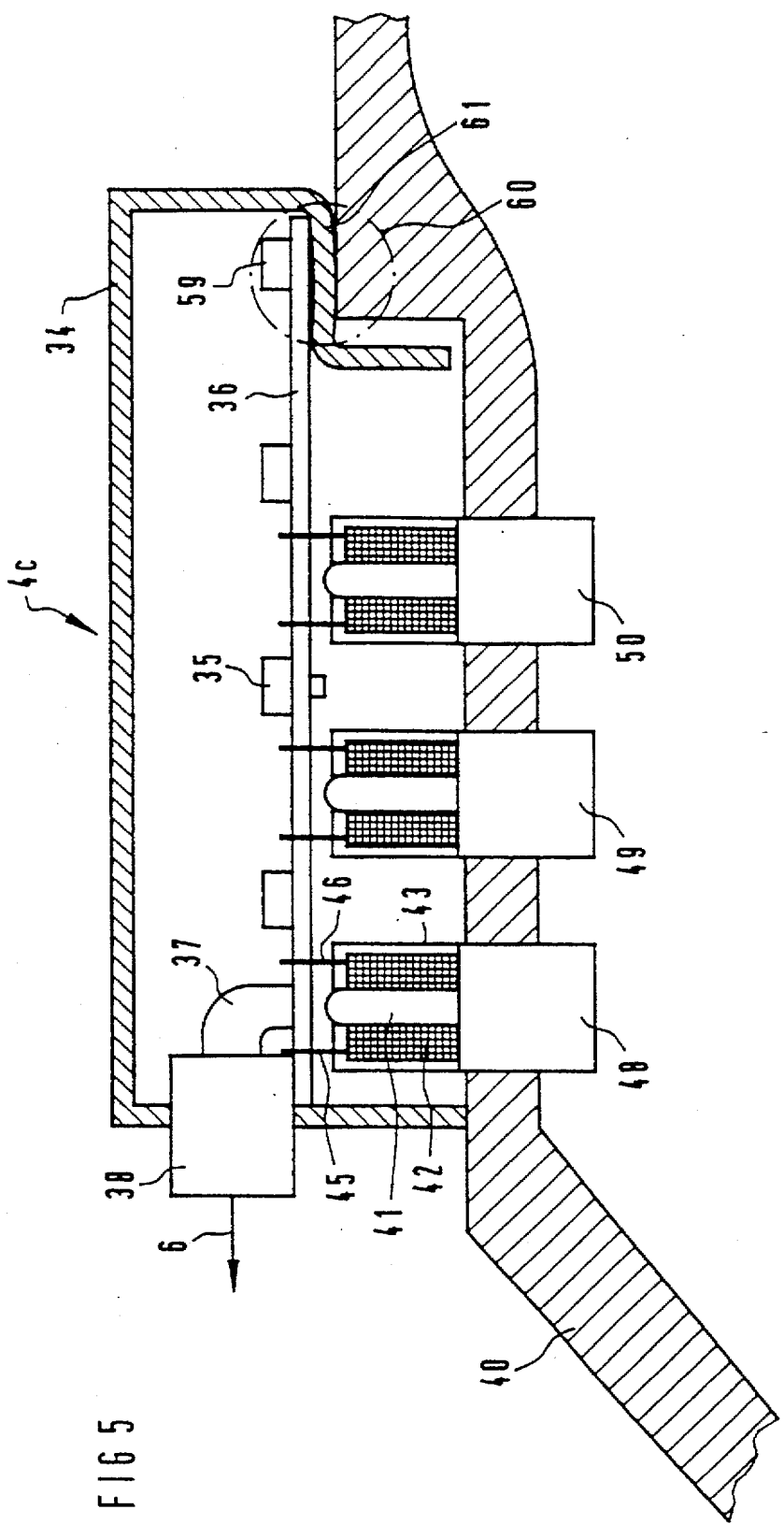

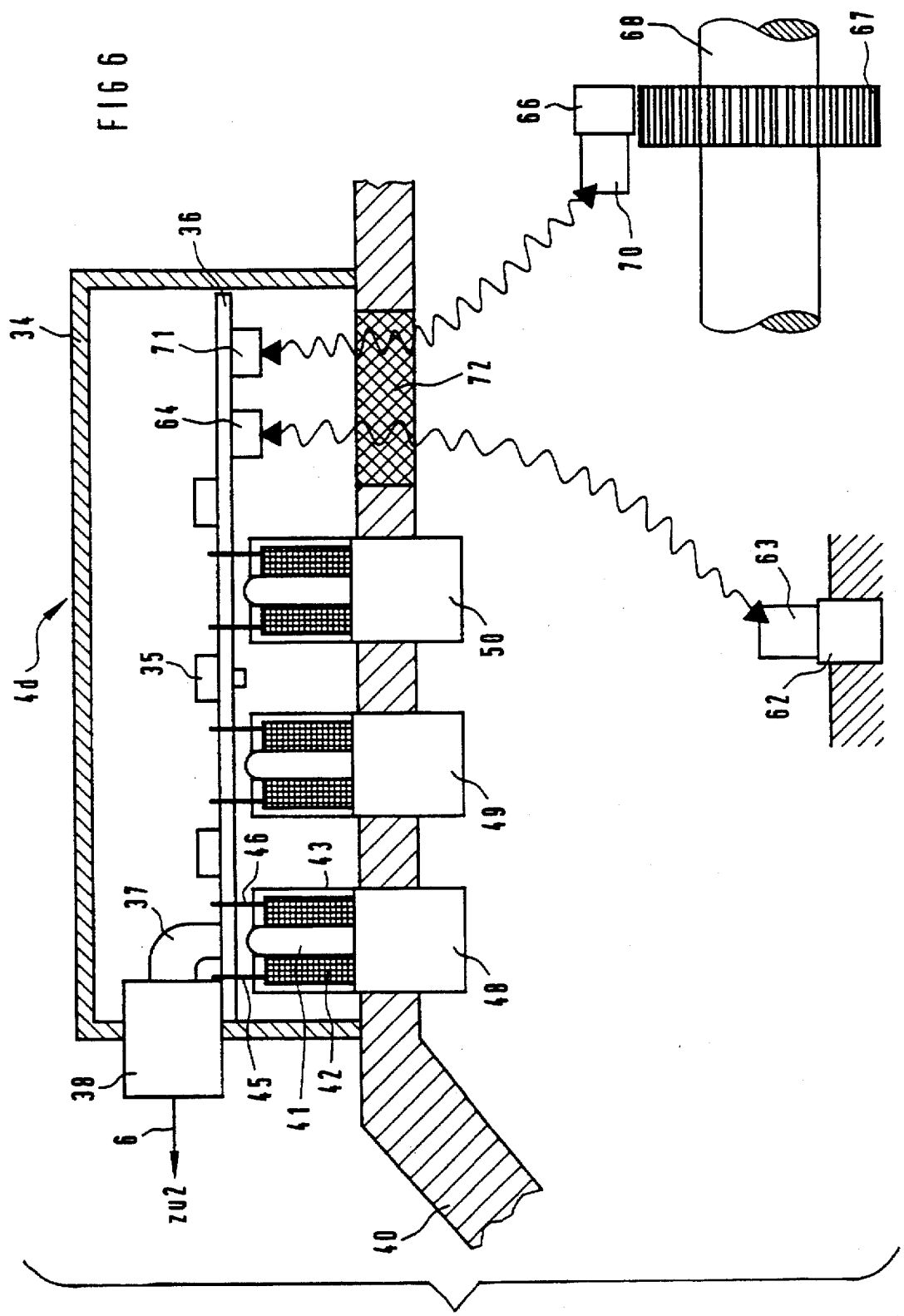

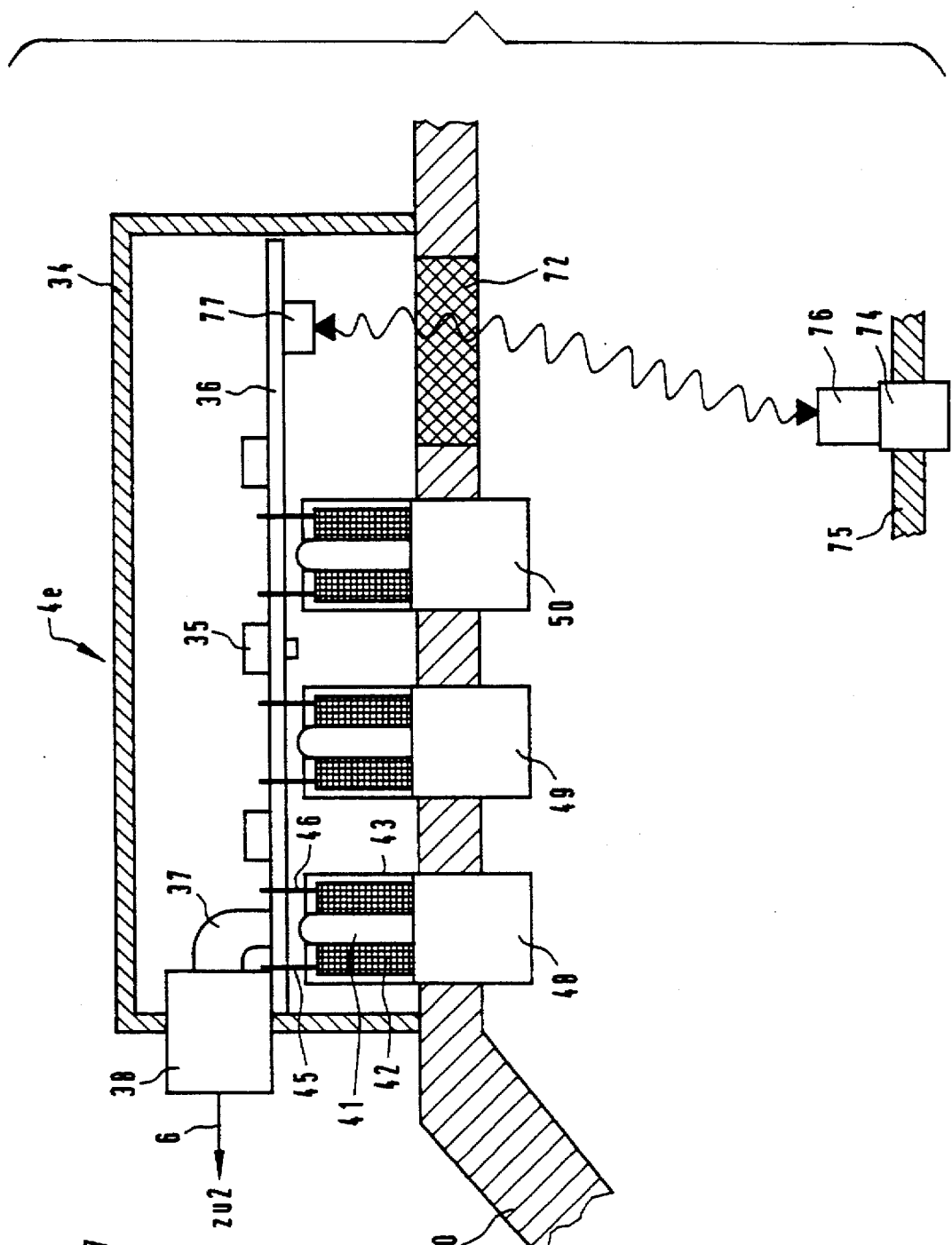

AUTOMATIC TRANSMISSION CONTROL FOR A MOTOR VEHICLE

CROSS-REFERENCE TO RELATED APPLICATION

This application is a Continuation of International Application Serial No. PCT/DE94/01188, filed Oct. 10, 1994.

BACKGROUND OF THE INVENTION

Field of the Invention

The invention relates to a control configuration for a motor vehicle with an automatic transmission accommodated in a housing, the control configuration including a transmission control device and an engine control device which are connected to one another by a communication channel, the transmission is shifted by using electrohydraulic pressure control valves which have coils and through which friction elements in the transmission are actuated, and sensor signals from sensors are transmitted to the transmission control device and evaluated therein.

Such controls in a motor vehicle with an automatic transmission include an engine control and a transmission control. The controls are available in different constructions.

In a known integrated control for the automatic transmission and the engine of a motor vehicle, the transmission is controlled by an independent control unit which is separate from the engine control (U.S. Pat. No. 4,945,481). A transmission control essentially has to carry out the following functions:

- a shift transition control which ensures a soft and wear-free engagement of individual gears;
- a control of a converter lockup clutch;
- a shift logic which specifies the respective gear to be engaged;
- a self-diagnosis; and
- basic functions, such as input functions and output functions, for example.

Since the shift transition control has to be configured in a transmission-specific way but the configuration of the shift logic depends, inter alia, on data regarding the engine and the chassis of the motor vehicle, a large number of different varieties of the control for various types of motor vehicles results. Furthermore, the outlay for a cable harness between the transmission control and the various valves and sensors in the transmission is extremely high.

SUMMARY OF THE INVENTION

It is accordingly an object of the invention to provide a control for a motor vehicle, which overcomes the hereinafore-mentioned disadvantages of the heretofore-known devices of this general type and which reduces the number of cable connections that are required and plug-in connections which are necessary therefor. With the foregoing and other objects in view there is provided, in accordance with the invention, in a motor vehicle with an automatic transmission being accommodated in a housing and having friction elements, a control configuration for the motor vehicle, comprising sensors transmitting sensor signals wirelessly; a transmission control device mounted at the transmission housing for receiving and evaluating the sensor signals transmitted by said sensors; an engine control device; a communication channel interconnecting said transmission control device and said engine control device; and electrohydraulic pressure control valves having coils integrated into said transmission control device, said control valves shifting the transmission and actuating the friction elements in the transmission.

In accordance with another feature of the invention, there is provided a gear shift lever, switch contacts for selection of driving programs of the automatic transmission by a driver, said switch contacts being integrated into said transmission control device, and a mechanical or magnetic connection connecting said switch contacts to said gear shift lever.

In accordance with a further feature of the invention, the transmission control device contains a magnetic flux sensor for measuring magnetic flux in said coils of said electrohydraulic pressure control valves.

In accordance with an added feature of the invention, the transmission has a measurement point, said transmission control device contains a temperature sensor for measuring a temperature of oil in the transmission, and there is provided a metal component being a good conductor of heat, for connecting the measurement point in the transmission to said temperature sensor.

In accordance with an additional feature of the invention, the transmission housing has a region assuming the temperature of the transmission oil, and said transmission control device has a printed circuit board on which said temperature sensor is mounted, said printed circuit board being thermally coupled to the region of the transmission housing.

In accordance with yet another feature of the invention, the sensors include a temperature sensor disposed inside the transmission housing, and there are provided a transponder connected to said temperature sensor, and a receiver in said transmission control device for receiving temperature measurement values from said transponder wirelessly on request.

In accordance with yet a further feature of the invention, the sensors include a rotational speed sensor disposed inside the transmission housing, and there are provided a transponder connected to said rotational speed sensor, and a receiver in said transmission control device for receiving rotational speed values from said transponder wirelessly on request.

In accordance with yet an added feature of the invention, the sensors are disposed inside the transmission housing, and there are provided a transponder being connected to said sensors and being supplied with power wireless by induction or high-frequency oscillations, and a receiver in said transmission control device for receiving measurement values from said transponder wirelessly on request.

In accordance with yet an additional feature of the invention, the sensors include a semiconductor pressure sensor disposed inside the transmission housing, and there are provided a transponder connected to said pressure sensor, and a receiver disposed in said transmission control device for receiving pressure measurement values from said transponder wirelessly on request.

In accordance with a concomitant feature of the invention, there are provided functional units of said transmission control device being dependent on data regarding an engine and regarding a chassis of the motor vehicle and being integrated into said engine control device; and functional units of said transmission control device being dependent on data regarding the transmission and being contained in a computer-controlled gear shifting device of the transmission; said communication channel exchanging data required for controlling the transmission between said engine control device and the gear shifting device.

The advantages of the invention lie in particular in the fact that the number of different varieties of controls for motor vehicle drives and the outlay for the cabling and the communication in the motor vehicle is significantly reduced. The chassis-specific and engine-specific functions of the transmission control can be moved into the engine control while the purely transmission-specific functions can remain in a computer-controlled gear shifting configuration. The latter constitutes an "intelligent" actuator which is completely tested at the manufacturer of the transmission. This results in a significant logistical advantage.

Other features which are considered as characteristic for the invention are set forth in the appended claims.

Although the invention is illustrated and described herein as embodied in a control for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a fragmentary, sectional view of an electronic transmission control with sensors for measuring oil temperature in the transmission;

FIG. 5 is a fragmentary, sectional view of an electronic transmission control with a temperature sensor which is thermally coupled to a transmission housing;

FIG. 6 is a fragmentary, sectional view of an electronic transmission control with sensors which transmit measurement data thereof to the transmission control through transponders; and FIG. 7 is a fragmentary, sectional view of an electronic transmission control with pressure sensors which are disposed in a transmission casing and which transmit measurement data thereof to the transmission control through transponders.

DESCRIPTION OF THE PREFERRED
EMBODIMENTS

Figure 1:
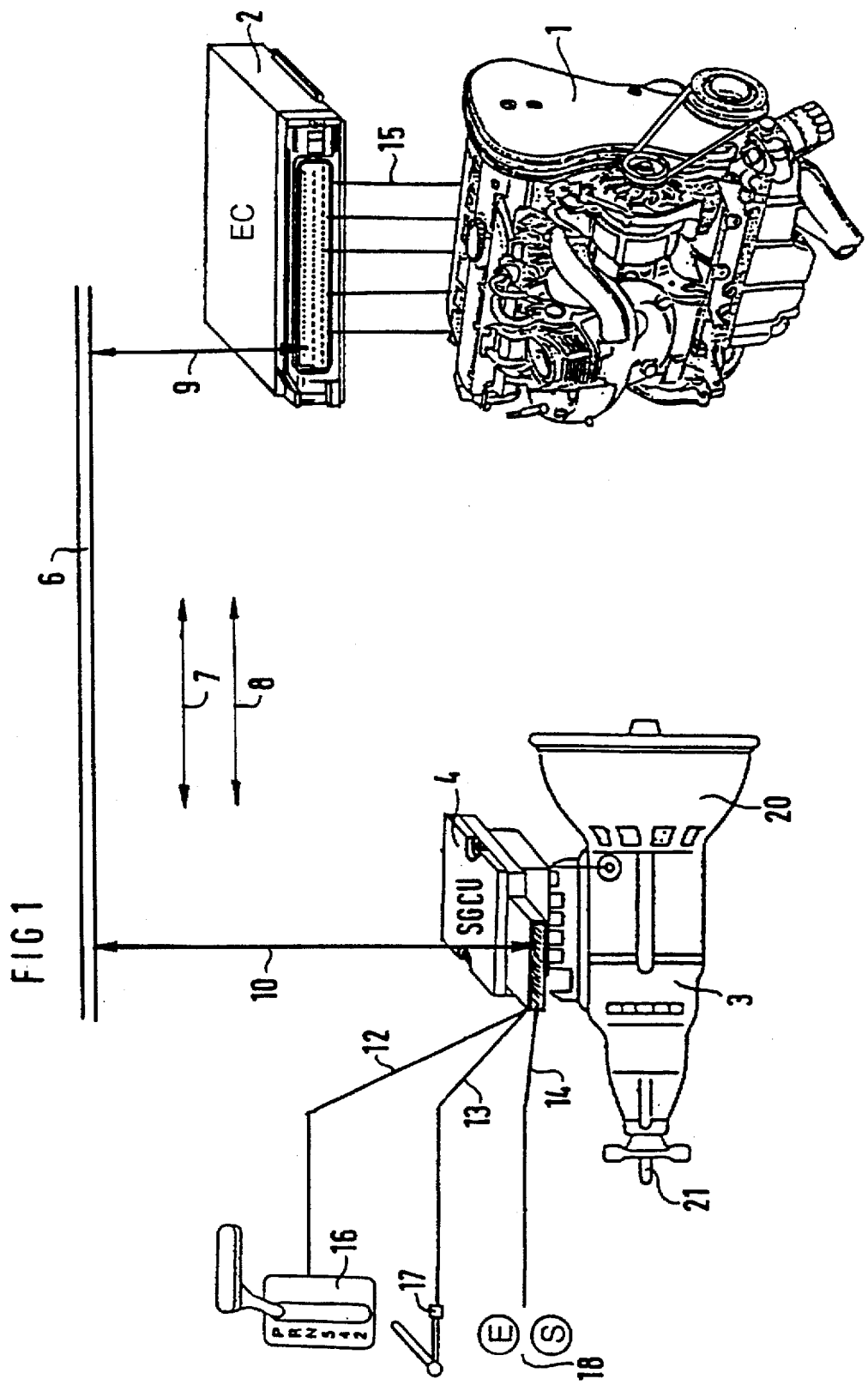
FIG. 1 is a diagrammatic, perspective view of essential components of a motor vehicle drive, which is provided with a control according to the invention that is shown in a schematic circuit diagram.

Referring now to the figures of the drawings in detail and first, particularly, to FIG. 1 thereof, there is seen an engine 1 which is controlled by an engine control 2 and a transmission 3 which is controlled by a transmission control 4 that is constructed in this case as a gear shifting device or configuration. The engine control 2 and the transmission control 4 are connected through the use of a communication channel 6 which is constructed, for example, as a CAN bus. This bus is only illustrated schematically in this case, since it is generally known and has been described in many publications.

On one hand, data which serve for gear selection and are indicated by an arrow 7 are exchanged between the engine control 2 and the transmission control 4, and on the other hand, configuration parameters, which serve for performing adaptation to the respective motor vehicle and which are indicated by an arrow 8, are exchanged. Examples of the data transmitted through the communication channel 6 are specified further below.

A bidirectional connection between the engine control 2 and the communication channel 6 is schematically indicated by a line 9, and a likewise bidirectional connection between the transmission control 4 and the communication channel 6 is indicated by a line 10.

A gear shift lever 16, a kickdown switch 17 and a driving program selection switch 18 are connected to the transmission control 4 through the use of respective signal lines 12, 13 and 14. A driver enters his or her instructions or wishes in a known manner into the transmission control 4 through the use of the following control elements: settings P, R, N, D, 2 and 1 are entered through the use of the gear shift lever 16, a request for strong acceleration is entered through the use of the kickdown switch 17 and a selection between an "economy" and a "sport" driving program is entered through the use of settings E and S of the driving program selection switch 18.

The engine 1 is connected to the engine control 2 through the use of control and signal lines 15. Sensor signals relating to an rpm, an engine temperature and other known operating parameters are transmitted through these signal lines from the engine 1 to the engine control 2 and instructions for controlling ignition, fuel injection quantity, ignition time and, if appropriate, other known engine parameters, are transferred from the engine control 2 to the engine 1.

The engine 1 and the transmission 3 are illustrated separately in this case for the sake of better clarity. However, it is generally known that a power output shaft of the engine 1 is connected directly to a torque converter 20 of the transmission 3. Correspondingly, an output shaft 21 is also connected to a power output train of the motor vehicle. A chassis, wheel suspensions, wheels and further components of the motor vehicle are not illustrated herein since they are not affected by the invention and are generally known.

Figure 2:
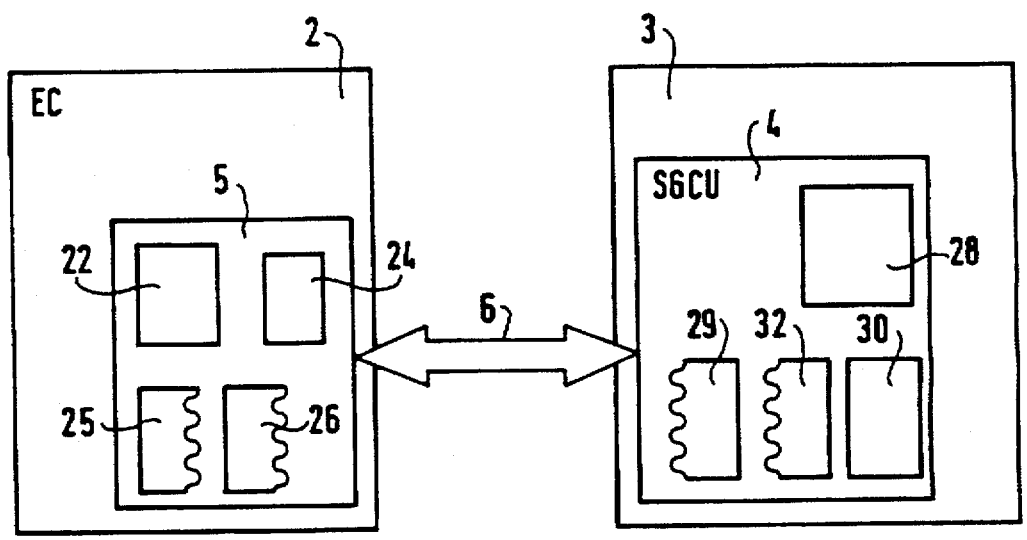
FIG. 2 is a block circuit diagram of the control of the drive according to FIG. 1.

Reference numeral 5 in FIG. 2 indicates some combined functional units of a transmission control which are chassis-specific or engine-specific, i.e. which depend on data regarding the engine and regarding the chassis of the motor vehicle and which are integrated into the engine control 2, namely: a shift logic or shift point selection control 22, a driver or driving characteristics classification 24, a diagnostic circuit 25 and basic modules 26 which, for example, carry out data input and output procedures. The shift logic 22 can be constructed as a fuzzy control and in this case can also contain the functions of driver or driving characteristics classification, route evaluation and dynamic shift point correction (in this regard, see Published European Patent Application 0 622 570).

The transmission control 4, which is constructed in this case as a computer-controlled gear shifting configuration, and is also referred to as SGCU (Smart Gear Change Unit), essentially only contains functional units that are dependent on data from on the transmission. These are a shift sequence control 28, a diagnostic circuit 29 for actuators, a control 30 of a converter lockup clutch or TCC (Torque Converter Clutch) and basic modules 32 which, for example, process signals of known sensors that are near to the transmission, such as signals of rpm sensors in the transmission and of temperature and hydraulic pressure sensors in the transmission, etc.

The transmission control 4 is constructed in such a way that only minimum chassis-dependent and engine-dependent parameterization of its functions is necessary, i.e. in such a way that it has to contain only a very small amount of data regarding the chassis and the engine of the respective motor vehicle. Thus by dividing up the functions between the engine control and the transmission control, the outlay for cabling between the engine control, the gear shifting configuration and the sensors and actuators, which are not illustrated in this case since they are generally known and are not changed by the invention, is very much reduced.

The transmission control 4 is directly attached to the housing of the transmission 3 or it is accommodated in that housing. The transmission control 4 is supplied by the manufacturer together with the transmission as one unit.

State variables Z and control variables S are exchanged between the engine control (EC) 2 and the gear shifting configuration (SGCU) or transmission control 4, through the communication channel 6. An example of the data to be exchanged is illustrated in the following table. In the table, reference symbol WK signifies the converter lockup clutch of the transmission.

| EC to SGCU | Type | SGCU to EC | Type |
|---|---|---|---|
| $M_{eng,act}$ (actual engine format | Z | | Z |
| $T_{des}$ (desired transmission ratio | S | $T_{des\ O.K.}$ (acceptance of desired transmission ratio) | Z |
| | | $T_{act}$ (actual transmission ratio) | Z |
| WK $slip_{des}$ (desired WK slip) | S | WK $slip_{act}$ (actual WK slip) | Z |
| | | Fault status of the SGCU | Z |
| | | Malfunction of the SGCU | Z |
| | | Restriction of functions of the SGCU | Z |
| $M_{red,act}$ (actual torque reduction) | Z | $M_{red,des}$ (desired torque reduction) | S |
| | | Transmission temperature | Z |
| | | Converter booster | Z |
| | | Gear shift lever position | Z |

In addition to such an exchange of data, parameters which are necessary for controlling the gear changing process can also be exchanged between the engine control 2 and the transmission control 4 through the communication channel 6. These parameters are expediently transmitted as physical units. An example of parameters to be transmitted is illustrated in the following table.

| EC to SGCU | SGCU to EC |
|---|---|
| Mass moment of inertia | Number of gears |
| Mass of vehicle | Transmission ratios |
| Wheel size | Shift types |

The term "shift types" herein refers to the gear changes which are acceptable depending on the respective transmission. Thus, for example, down shifting from fifth into first or second and to a certain extent also into third gear, is not permitted in many transmissions.

This results in the following advantages: only a minimum of engine-specific and chassis-specific data are required by the transmission control 4. The latter is completely independent of the data regarding the engine and the chassis. Only a minimum of transmission-specific data is required in the engine control 2. The result thereof is that the gear box control does not have to be adapted to different varieties of engine and chassis during manufacture. A microprocessor or computer (which is not illustrated in this case since it is generally known) contained in the transmission control ensures that adaptation is carried out through the use of transmitted engine and chassis parameters. Another possibility is to store data sets for the various varieties of vehicles in the transmission control 4 and to activate the respective data set of one of these varieties through the use of a code word which is transmitted to the transmission control 4 through the communication channel 6.

In addition to the transference of physical parameters, state variables and control variables, identification information can also be exchanged between the engine control and the transmission control. This achieves the following:

If components are replaced, for example within the scope of repairs, provision is made for the components to use the communication channel 6 to exchange identification data which are variety-specific, i.e. which identify the type of motor vehicle for which the respective component is suitable. Thus, the other components or control units are capable of detecting whether or not they are capable of operating with one another. In this way it is detected if, for example, a transmission which is unsuitable for the motor vehicle has been inadvertently installed.

Through the use of this exchange of control unit-specific identification data, it is also possible to prohibit unauthorized exchange of components or units. As a result, for example, repair by unauthorized workshops and in particular installation of stolen units into a motor vehicle or of replacement components in a stolen motor vehicle are effectively prevented. Thus, an improved protection against theft is also provided.

Figure 3:
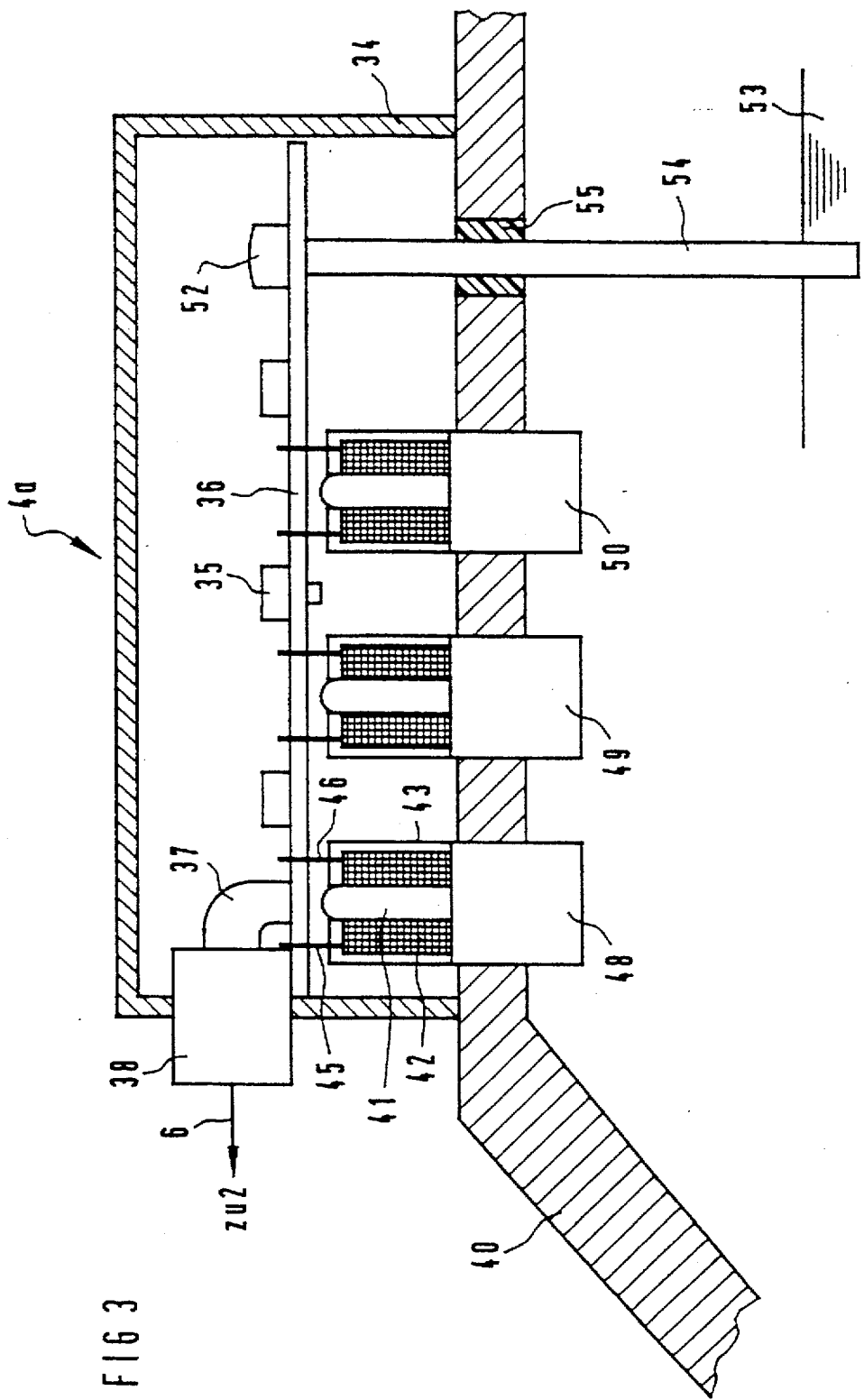
FIG. 3 is a fragmentary, sectional view of an electronic transmission control with magnetic flux sensors for measuring valve tappet forces.

A housing 34 of a transmission control or gear shifting device 4a is illustrated in FIG. 3 in a fragmentary, sectional view. Components of the electronic circuit, which are only diagrammatically illustrated in this case as components 35, are disposed on a board or printed circuit board 36. The board 36 has non-illustrated conductor tracks to which the components 35 are connected in a conductive fashion. The circuit components on the board 36 are connected through a plurality of lines 37 to a plug 38 through which external connections of the transmission control are made, in particular the connection to the engine control 2.

The transmission control 4a is directly mounted on the automatic transmission 3 of the motor vehicle. Part of a transmission housing 40 is illustrated in FIG. 3. A plurality of valves having respective hydraulic slides which plug into a so-called valve dome 41, are guided through a wall of the transmission housing 40 in such a way that they project into the transmission control 4a. Each valve dome 41 is surrounded by a solenoid 42 with a yoke 43. The solenoids 42 are supplied with current and controlled by the electronic circuit on the printed circuit board 36 through connection lines 45 and 46.

The valves, of which two switching valves 48 and 49 and a proportional valve 50 are illustrated in this case, serve in a known manner for the actuation of clutches and brakes in the automatic transmission and thus for controlling shifting processes. As is known, each valve contains a valve body and a plunger which can be moved therein and is moved through the use of currents flowing in the respective solenoid.

A temperature sensor 52, with which a temperature of hydraulic oil 53 in the transmission is measured, is also mounted on the printed circuit board 36. An element which is a good conductor of heat, for example a thick copper wire 54, thermally couples the temperature sensor 52 to the transmission oil or to part of the transmission housing 40 which is in contact with the transmission oil and thus assumes its temperature. The copper wire or cable is insulated with respect to the transmission housing through the use of a plastic sleeve 55.

The transmission control 4 thus forms a structural unit with the hydraulic valves 48, 49, 50 of the transmission.

In the case of a further exemplary embodiment of the transmission control 4 which can be seen from FIG. 4, the components, which correspond to those in FIG. 3, are provided with the same reference symbols. A magnetic flux sensor 58, for example in the form of an SMD component, in this case is mounted on the printed circuit board 36. Such magnetic flux sensors are commercially available. The magnetic flux sensor 58 measures magnetic flux in the solenoid 42 of the proportional valve 50, or the switching valves 48 and 49, and thus directly measures the force acting on the respective valve tappet. This results in a cost-effective and space-saving way of measuring force. A further advantage lies in the fact that the influence of the magnetic hysteresis on the entire hysteresis of the hydraulic valves 48 to 50 is also automatically compensated. Thus, a higher degree of precision of the valve control can be achieved than in the case of a pure current control.

A further exemplary embodiment of a transmission control 4c which is shown in FIG. 5 has a temperature sensor 59 that is mounted on the printed circuit board 36 and is thermally closely coupled to the transmission housing 40, specifically in a region indicated by a dot-dash circle 60. For this purpose, the temperature sensor 59 and the transmission housing 40 are connected to a metal element 61 which is a good conductor of heat. The connection must be made in a region of the transmission housing 40 which is in contact with the hydraulic oil and assumes its temperature.

In a further exemplary embodiment of a transmission control 4d shown in FIG. 6, the measurement values are transmitted by sensors from a measurement point or location to the transmission control, in a wireless fashion. A temperature sensor 62 is disposed inside the transmission housing 40 and is connected to a transponder element 63 which on request transfers the measurement data by radio to a first transponder transmitter and receiver 64 which is mounted on the printed circuit board 36.

A magnetic rpm or rotational speed sensor 66, for example a Hall sensor, senses interruptions at an outer periphery of a pole wheel or a toothed wheel 67 which is mounted on a transmission shaft 68, and thus measures its rotational speed or rpm. The rotational speed sensor 66 is also provided with a transponder element 70 which on request transfers the measurement data to a second transponder transmitter and receiver 71 on the printed circuit board 36 in a wireless fashion. For this purpose, the transmission housing 40 must have a region 72 which is permeable to electromagnetic waves.

In yet another exemplary embodiment of a transmission control 4e shown in FIG. 7, a pressure sensor 74 is mounted on a mount or rib 75 inside the transmission housing 40 and is provided with a transponder element 76. This transponder element transmits the measurement data to a transponder transmitter and receiver 77 which is mounted on the printed circuit board 36 of the transmission control 4e.

The transponder transmitter 77 supplies the transponder element 76 with power by induction or high-frequency electromagnetic waves so that the transponder element does not require its own power supply, for example a battery. Correspondingly, the transponder transmitters and receivers 64 and 71 can also supply the respective transponder elements 62 and 70 with power in a wireless fashion. The transponder element 70 can also be supplied with power by an alternating magnetic field which is generated by the rotating transmission shaft 66.

The temperature sensor 62 and the rotational speed sensor 66 can also be connected to a combined transponder which transfers both the temperature values and the rotational speed or rpm values to the transmission control 4d.

The pressure sensor 74 of FIG. 7 can be formed of a commercially available semiconductor sensor element on a silicon base.

One or more of the solenoids 42 of the hydraulic valves 48 to 50 can also be used as an inductive transmitting and receiving element for the transfer of measurement data between the sensors and the electronic circuit of the transmission control 4. Finally, an induction loop which is installed in the transmission and a modulator stage which is connected thereto can also be used for transmitting data in a wireless fashion. If, for a particular reason, the transfer of measurement data actually has to take place in a wire-bound fashion, the valve domes 41 can be used as plug-type contacts for transmitting the electrical sensor signals.

We claim:

1. In a motor vehicle with an automatic transmission being accommodated in a housing and having friction elements, a control configuration for the motor vehicle, comprising:

sensors transmitting sensor signals wirelessly;

a transmission control device mounted at the transmission housing for receiving and evaluating the sensor signals transmitted by said sensors;

an engine control device;

a communication channel interconnecting said transmission control device and said engine control device; and electrohydraulic pressure control valves having coils integrated into said transmission control device, said control valves shifting the transmission and actuating the friction elements in the transmission, wherein said sensors transmitting sensor signals wirelessly include a temperature sensor disposed inside the transmission housing, and including a transponder connected to said temperature sensor, and a receiver in said transmission control device for receiving temperature measurement values from said transponder wirelessly on request.

2. In a motor vehicle with an automatic transmission being accommodated in a housing and having friction elements, a control configuration for the motor vehicle, comprising:

sensors transmitting sensor signals wirelessly;

a transmission control device mounted at the transmission housing for receiving and evaluating the sensor signals transmitted by said sensors;

an engine control device;

a communication channel interconnecting said transmission control device and said engine control device; and electrohydraulic pressure control valves having coils integrated into said transmission control device, said control valves shifting the transmission and actuating the friction elements in the transmission, wherein said sensors transmitting sensor signals wirelessly include a rotational speed sensor disposed inside the transmission housing, and including a transponder connected to said rotational speed sensor, and a receiver in said transmission control device for receiving rotational speed values from said transponder wirelessly on request.

3. In a motor vehicle with an automatic transmission being accommodated in a housing and having friction elements, a control configuration for the motor vehicle, comprising:

sensors transmitting sensor signals wirelessly;

a transmission control device mounted at the transmission housing for receiving and evaluating the sensor signals transmitted by said sensors;

an engine control device;

a communication channel interconnecting said transmission control device and said engine control device; and electrohydraulic pressure control valves having coils integrated into said transmission control device, said control valves shifting the transmission and actuating the friction elements in the transmission, wherein said sensors transmitting sensor signals wirelessly are disposed inside the transmission housing, and including a transponder being connected to said sensors and being supplied with power wireless by induction, and a receiver in said transmission control device for receiving measurement values from said transponder wirelessly on request.

4. In a motor vehicle with an automatic transmission being accommodated in a housing and having friction elements, a control configuration for the motor vehicle, comprising:

sensors transmitting sensor signals wirelessly;

a transmission control device mounted at the transmission housing for receiving and evaluating the sensor signals transmitted by said sensors;

an engine control device;

a communication channel interconnecting said transmission control device and said engine control device; and electrohydraulic pressure control valves having coils integrated into said transmission control device, said control valves shifting the transmission and actuating the friction elements in the transmission, wherein said sensors transmitting sensor signals wirelessly are disposed inside the transmission housing, and including a transponder being connected to said sensors and being supplied with power wireless by high-frequency oscillations, and a receiver in said transmission control device for receiving measurement values from said transponder wirelessly on request.

5. In a motor vehicle with an automatic transmission being accommodated in a housing and having friction elements, a control configuration for the motor vehicle, comprising:

sensors transmitting sensor signals wirelessly;

a transmission control device mounted at the transmission housing for receiving and evaluating the sensor signals transmitted by said sensors;

an engine control device;

a communication channel interconnecting said transmission control device and said engine control device; and electrohydraulic pressure control valves having coils integrated into said transmission control device, said control valves shifting the transmission and actuating the friction elements in the transmission, wherein said sensors transmitting sensor signals wirelessly include a semiconductor pressure sensor disposed inside the transmission housing, and including a transponder connected to said pressure sensor, and a receiver disposed in said transmission control device for receiving pressure measurement values from said transponder wirelessly on request.

* * * * *